United States Patent [19]
Wun-Fogle et al.

[11] Patent Number: 5,168,760
[45] Date of Patent: Dec. 8, 1992

[54] MAGNETIC MULTILAYER STRAIN GAGE

[75] Inventors: Marilyn Wun-Fogle, Gaithersburg; Arthur E. Clark, Adelphi, both of Md.; Kristl B. Hathaway, Arlington, Va.

[73] Assignee: The United States of America as represented by the Secretary of the Navy, Washington, D.C.

[21] Appl. No.: 786,641

[22] Filed: Nov. 1, 1991

[51] Int. Cl.$^5$ .................................................. G01B 7/24
[52] U.S. Cl. .................................... 73/779; 73/862.69
[58] Field of Search .............. 73/779, 862.69, DIG. 2, 73/DIG. 3; 324/209

[56] References Cited
U.S. PATENT DOCUMENTS
4,979,395 12/1990 Pratt ........................................ 73/779

Primary Examiner—Jerry W. Myracle
Attorney, Agent, or Firm—Kenneth E. Walden; Jacob Shuster

[57] ABSTRACT

A strain gauge comprised of a magnetic multilayer assembly exhibiting spin-valve effect with individual ferromagnetic layers possessing magnetostrictive properties. A magnetic field source is used to bias the magnetic moments of the ferromagnetic layers in a given direction whereby stress applied causes previously antiferromagnetically coupled moments to be angularly realigned toward a ferromagnetic arrangement. Such realignment causes a corresponding resistance change of unexpectedly high magnitude thereby providing a highly sensitive strain gauge.

10 Claims, 1 Drawing Sheet

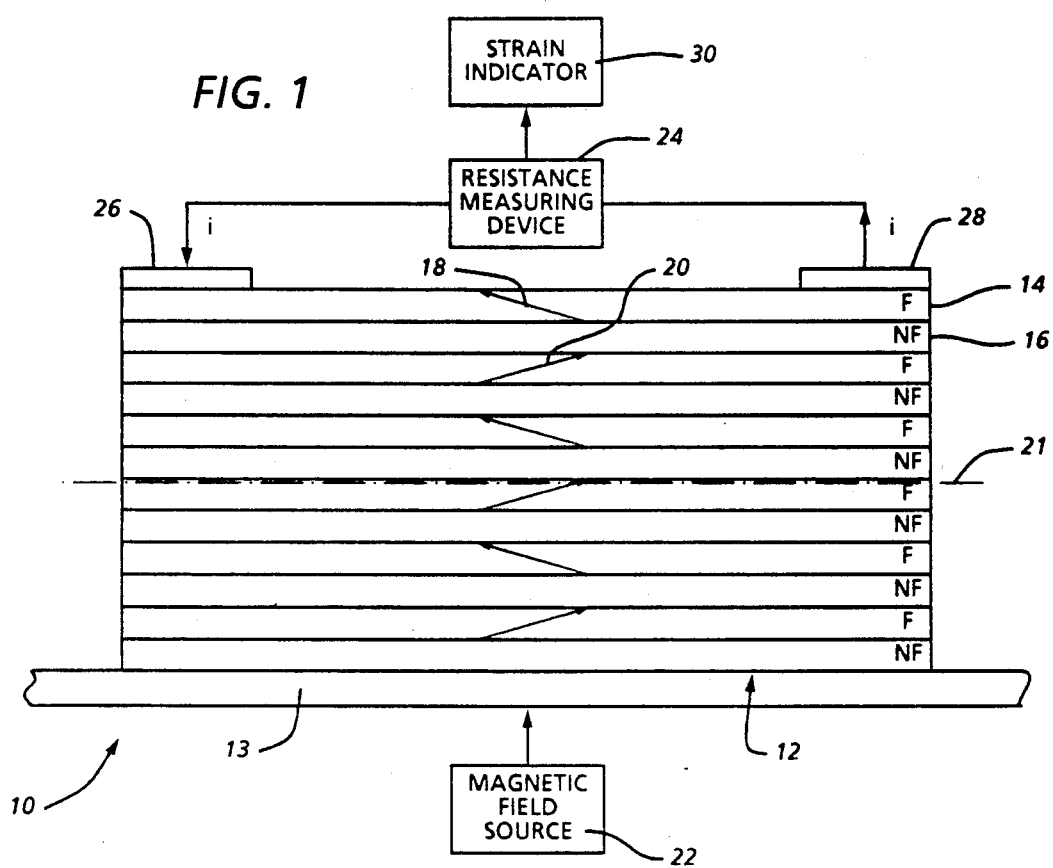
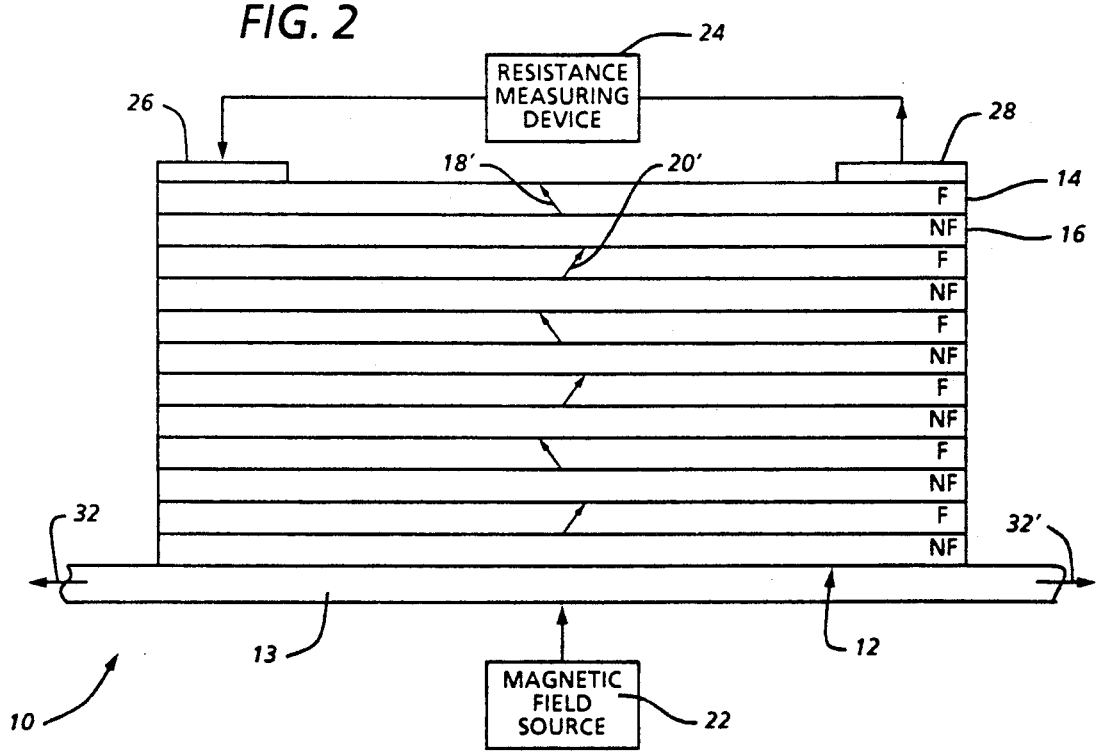

MAGNETIC MULTILAYER STRAIN GAGE

BACKGROUND OF THE INVENTION

1. Field of the Invention

The invention relates generally to strain gauges and more particularly to an electrically operated strain gauge providing an extraordinarily high sensitivity to applied stress.

2. Description of the Prior Art

It has long been a goal to develop a strain gauge of compact design that is highly sensitive. U.S. Pat. No. 4,884,453 to Hoffmann et al. for example relates to a ferromagnetic thin film type of strain gauge possessing magnetostrictive and anisotropic magnetoresistive properties. According to the disclosure in the Hoffmann et al. patent, magnetostrictive behavior causes a change in the direction of magnetization away from an easy axis whenever the strain gauge is subjected to stress. In proportion to the mechanical stress applied, the magnetization changes its direction by as much as 90°. This change in direction yields a corresponding change in the resistance of the thin film of less than 2% due to the anisotropic magnetoresistance effect.

Research activity in the last few years involving magnetic multilayer assemblies has been described in scientific literature, unrelated however to magnetostrictive types of strain gauges. Generally, such magnetic multilayer assemblies comprise alternating thin film layers of ferromagnetic material and nonferromagnetic conductive material. Magnetic moments of the magnetic fields in alternate layers of the ferromagnetic material naturally align in a perfect 180° antiferromagnetic coupling arrangement parallel to an easy axis. Upon introduction of an external magnetic field, the magnetic moments realign by relative angular displacement up to 90°. Such realignment results in a corresponding change in electrical resistance due to what is now known as a "spin-valve" effect. Resistance changes of as high as 65% have been reported at room temperature.

The foregoing referred to "spin-valve" effect depends not on the rotation of a single magnetic moment and the resulting change in the direction of magnetization, but on the realignment of antiferromagnetically coupled magnetic moments. Such resistance changes are proportional to the degree of realignment.

It is an important object of the present invention to provide a strain gauge of a multi-film layer type that is readily adaptable to miniaturization.

It is a further object of the present invention to provide a strain gauge that can be miniaturized for operation on microchips or integrated into other small devices.

SUMMARY OF THE INVENTION

An important discovery of the present invention resides in utilization of the aforementioned "spin-valve" effect to provide a strain gauge having a sensitivity of unexpectedly high magnitude.

According to the invention, the strain gauge utilizes a plurality of magnetic layers exhibiting the "spin-valve" effect, including ferromagnetic layers possessing magnetostrictive properties. Upon application of tensile or compressive stress to the magnetic multilayer assembly, the respective magnetic moments in the ferromagnetic layers rotate up to 90° away from an easy axis due to the magnetostrictive behavior thereof. In order to guarantee relative ferromagnetic orientation of the magnetic moments when the magnetic multilayer assembly is subjected to stress, a low level magnetic field is applied in a direction not parallel to the magnetic moments of the ferromagnetic layers. The bias of such magnetic field serves to slightly rotate the respective magnetic moments from an extremely antiferromagnetic coupling arrangement, in alignment with the easy axis, to one that is less extreme. Application of stress will accordingly cause such previously displaced moments to be further realigned toward a ferromagnetic coupling arrangement with a resulting unexpectedly large change in resistance exceeding 2%. Such resistance change enables more accurate resistance measurements reflecting strain.

BRIEF DESCRIPTION OF THE DRAWINGS

Other objects, advantages and novel features of the invention will become apparent from the following detailed description of the invention when considered in conjunction with the accompanying drawing wherein:

FIG. 1 is a schematic side view of a strain gauge in accordance with the present invention wherein magnetic moments are biased in an essentially antiferromagnetic coupling arrangement;

FIG. 2 is a schematic side view of the strain gauge shown in FIG. 1 under stress, wherein the magnetic moments are rotationally realigned toward a ferromagnetic coupling arrangement.

DETAILED DESCRIPTION OF PREFERRED EMBODIMENT

Referring now to FIG. 1, the strain gauge is generally designated by reference numeral 10 and includes a magnetic multilayer assembly 12 mounted by deposition on a substrate 13, an external source 22 through which a magnetic field is applied to the assembly 12, a resistance measuring device 24 connected to the magnetic multilayer assembly 12 by electrodes 26 and 28, and an indicator 30 through which readout of strain measurement data is displayed.

The magnetic multilayer assembly 12 is comprised of alternate thin film type of ferromagnetic layers 14 and nonferromagnetic conductive layers 16. The layers 14 are made of a ferromagnetic material possessing magnetostrictive properties. The nonferromagnetic conductive layers 16 are made of materials selected from the 3d, 4d or 5d transition metals that are not ferromagnetic. According to one preferred embodiment, the ferromagnetic layers 14 are made of cobalt while the nonferromagnetic layers 16 are made of copper providing a 65% resistance change. Aside from the proper selection of materials for the layers 14 and 16, sensitivity of the strain gauge 10 will also depend on the number and thickness of the layers of the magnetic multilayer assembly 12. The thickness of the ferromagnetic layers 14 according to certain embodiments is between 10 and 100 Angstroms while that of the nonferromagnetic conductive layers 16 is between 4 and 20 Angstroms. The maximum resistance change achieved furthermore increases with an increase in the number of layers, leveling off at about sixty ferromagnetic layers 14.

In the preferred embodiment of the strain gauge 10, wherein the magnetic multilayer assembly 12 is comprised of 60 cobalt layers 14 of 8 Angstroms thickness interspaced with copper layers 16 of 8.3 Angstrom thickness, the external magnetic field is established by a permanent magnet as the field energy source 22. Such magnetic field is directionally applied to the magnetic multilayer assembly 12 in non-parallel relation to the longitudinal easy axis 21 of the magnetic multilayer assembly 12 for small angular displacement of magnetic moments 18 and 20 in alternate ferromagnetic layers 14 away from their naturally perfect 180° antiferromagnetic coupling alignment toward one that is less than perfect as seen in FIG. 1.

Electrodes 26, 28 are connected to the magnetic multilayer assembly 12 on opposite longitudinal ends. Further, connected to the electrodes 26, 28 is a resistance measuring device 24 such as an ohmmeter applying a voltage across the multilayer assembly 12 to measure its electrical resistance. Any changes in the resistance measured by device 24 produces an output therefrom applied to indicator 30 as diagrammed in FIG. 1.

FIG. 2 represents the strain gauge 10 of FIG. 1 with stress applied thereto through substrate 13 as indicated by tensioning forces 32,32'. The stress applied may be either tensile as shown or compressive stress. Affected magnetic moments 18' and 20' have undergone planar rotation as shown due to the magnetostrictive behavior of the alternate ferromagnetic layers 14. Such rotation of the magnetic moments has caused them to approach alignment in a ferromagnetic coupling arrangement, perpendicular to the longitudinal axis of the multilayer assembly 12. It should be noted that stressing the magnetic multilayer assembly 12 without an external magnetic field applied thereto from source 22 would not produce the "spin-valve" effect wherein the moments are angularly realigned toward the perfect ferromagnetical arrangement at 90° to the longitudinal axis. When such "spin-valve" effect occurs, a substantial increase in the conductivity of the magnetic multilayer assembly 12 is reflected by a large resistance change capable of being readily measured through the measuring device 24 connected to assembly 12 by the electrodes 26 and 28. As with any resistance type strain gauge, the measured resistance change will provide an indication of strain through indicator 30.

The strain gauge 10 while described in connection with substrate 13, may be associated with other objects in which the strain is to be measured such as a microchip. Sensitivity to strain is thereby provided far in excess of the common metallic or semiconductor types of strain gauges.

Numerous other modifications and variations of the present invention are possible in light of the foregoing teachings. It is therefore to be understood that within the scope of the appended claims the invention may be practiced otherwise than as specifically described.

What is claimed is:

1. In a strain gauge comprising magnetostrictive means having ferromagnetic material to which stress is applied causing angular displacement of magnetic moments therein away from an unstressed easy axis and means for measuring changes in electrical resistance of the magnetostrictive means in response to said angular displacement of the magnetic moments, the improvement residing in said ferromagnetic material being formed into a plurality of layers parallel to the easy axis and said magnetostrictive means further including, antiferromagnetic layers of conductive material between said layers of the ferromagnetic material[1] and means applying a magnetic field to said layers for realigning the magnetic moments relative to the easy axis to increase the measured changes in the electrical resistance caused by the stress applied.

2. The combination of claim 1 wherein said conductive material is copper and the ferromagnetic material is cobalt.

3. The combination of claim 2 wherein said increased changes in the electrical resistance are greater than 2%.

4. The combination of claim 3 wherein said plurality of layers of the ferromagnetic material number less than 60.

5. The combination of claim 4 wherein each of said layers of the ferromagnetic material is between 10 and 100 Angstroms in thickness.

6. The combination of claim 5 wherein each of the antiferromagnetic layers of the conductive material is between 4 and 20 Angstroms in thickness.

7. The combination of claim 1 wherein said layers of the ferromagnetic material number less than 60.

8. The combination of claim 1 wherein each of said layers of the ferromagnetic material is between 10 and 100 Angstrom in thickness.

9. The combination of claim 8 wherein each of the antiferromagnetic layers of the conductive material is between 4 and 20 Angstroms in thickness.

10. The combination of claim 1 wherein said increased changes in the electrical resistance are greater than 2%.

* * * * *